US010947888B2

(12) United States Patent
Zhang et al.

(10) Patent No.: US 10,947,888 B2
(45) Date of Patent: Mar. 16, 2021

(54) UREA MIXER

(71) Applicant: Ford Global Technologies, LLC, Dearborn, MI (US)

(72) Inventors: Xiaogang Zhang, Novi, MI (US); Jianwen James Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 16/059,320

(22) Filed: Aug. 9, 2018

(65) Prior Publication Data
US 2018/0347439 A1 Dec. 6, 2018

Related U.S. Application Data

(62) Division of application No. 15/042,680, filed on Feb. 12, 2016, now Pat. No. 10,100,706.

(51) Int. Cl.
| | | |
|---|---|---|
| *F01N 13/08* | (2010.01) | |
| *F01N 3/28* | (2006.01) | |
| *F01N 9/00* | (2006.01) | |
| *F01N 3/20* | (2006.01) | |

(52) U.S. Cl.
CPC ........... *F01N 13/082* (2013.01); *F01N 3/208* (2013.01); *F01N 3/2892* (2013.01); *F01N 9/00* (2013.01); *F01N 2240/20* (2013.01); *F01N 2470/02* (2013.01); *F01N 2470/30* (2013.01); *F01N 2610/02* (2013.01); *F01N 2900/1411* (2013.01); *Y02A 50/20* (2018.01); *Y02T 10/12* (2013.01); *Y02T 10/40* (2013.01)

(58) Field of Classification Search
CPC ............... F01N 13/082; F01N 2240/20; F01N 2470/02; F01N 2470/30; F01N 2610/02; F01N 2900/1411; F01N 3/208; F01N 3/2892; F01N 9/00; Y02A 50/2325; Y02T 10/24; Y02T 10/47
See application file for complete search history.

(56) References Cited

U.S. PATENT DOCUMENTS

| | | | |
|---|---|---|---|
| 5,522,218 A * | 6/1996 | Lane .................. | B01D 53/9495 60/274 |
| 6,416,213 B1 | 7/2002 | Fukunaga | |
| 6,439,212 B1 | 8/2002 | Coleman et al. | |
| 7,032,578 B2 | 4/2006 | Liu et al. | |

(Continued)

FOREIGN PATENT DOCUMENTS

| | | |
|---|---|---|
| CN | 1864835 A | 11/2006 |
| CN | 101624932 A | 1/2010 |

OTHER PUBLICATIONS

National Intellectual Property Administration of the People's Republic of China, Office Action and Search Report Issued in Application No. 201710070410.7, dated Apr. 27, 2020, 11 pages. (Submitted with Partial Translation).

(Continued)

*Primary Examiner* — Hai H Huynh
*Assistant Examiner* — Diem T Tran
(74) *Attorney, Agent, or Firm* — Geoffrey Brumbaugh; McCoy Russell LLP

(57) ABSTRACT

Methods and systems are provided for a urea mixer. In one example, a urea mixer may include a plurality of outlets located adjacent a throat of a venturi passage.

11 Claims, 5 Drawing Sheets

(56) References Cited

U.S. PATENT DOCUMENTS

| | | | |
|---|---|---|---|
| 7,497,077 B2 | 3/2009 | Dodge et al. | |
| 7,712,305 B2 | 5/2010 | Kapsos et al. | |
| 8,047,185 B2 | 11/2011 | Ulrey et al. | |
| 8,117,830 B2 | 2/2012 | Hiranuma et al. | |
| 8,171,722 B2 * | 5/2012 | Rodman | B01F 3/04049 |
| | | | 239/533.3 |
| 8,297,050 B2 | 10/2012 | Ranganathan et al. | |
| 8,756,923 B2 | 6/2014 | Tamamidis | |
| 8,844,574 B2 | 9/2014 | Grob et al. | |
| 9,273,580 B2 * | 3/2016 | Huthwohl | F01N 3/2066 |
| 9,410,464 B2 | 8/2016 | Hicks et al. | |
| 2006/0245296 A1 * | 11/2006 | Nishioka | B01D 53/8631 |
| | | | 366/174.1 |
| 2007/0036694 A1 | 2/2007 | Nishioka et al. | |
| 2009/0050120 A1 | 2/2009 | Bischofberger et al. | |
| 2009/0255242 A1 | 10/2009 | Paterson et al. | |
| 2010/0300413 A1 | 12/2010 | Ulrey et al. | |
| 2011/0239631 A1 | 10/2011 | Bui et al. | |
| 2013/0047959 A1 | 2/2013 | Holm | |
| 2013/0104531 A1 | 5/2013 | Cho et al. | |
| 2013/0340732 A1 | 12/2013 | Pursifull et al. | |
| 2015/0040537 A1 | 2/2015 | Hicks et al. | |

OTHER PUBLICATIONS

National Intellectual Property Administration of the People's Republic of China, Office Action and Search Report Issued in Application No. 201710167791.0, dated May 28, 2020, 14 pages. (Submitted with Partial Translation).

* cited by examiner

UREA MIXER

CROSS REFERENCE TO RELATED APPLICATION

The present application is a divisional of U.S. patent application Ser. No. 15/042,680, entitled "UREA MIXER," filed on Feb. 12, 2016. The entire contents of the above-referenced application are hereby incorporated by reference in its entirety for all purposes.

FIELD

The present description relates generally to methods and systems for a urea mixer.

BACKGROUND/SUMMARY

One technology for after-treatment of engine exhaust utilizes selective catalytic reduction (SCR) to enable certain chemical reactions to occur between NOx in the exhaust and ammonia (NH3). NH3 is introduced into an engine exhaust system upstream of an SCR catalyst by injecting urea into an exhaust pathway, or is generated in an upstream catalyst. The urea entropically decomposes to NH3 under high temperature conditions. The SCR facilitates the reaction between NH3 and NOx to convert NOx into nitrogen (N2) and water (H2O). However, as recognized by the inventor herein, issues may arise upon injecting urea into the exhaust pathway. In one example, urea may be poorly mixed into the exhaust flow (e.g., a first portion of exhaust flow has a higher concentration of urea than a second portion of exhaust flow) which may lead to poor coating of the SCR and poor reactivity between emissions (e.g., NOx) and the SCR. Additionally, overly mixing and agitating the urea in the exhaust can likewise cause issues, such as increased deposits.

Attempts to address insufficient mixing include introducing a mixing device downstream of a urea injector and upstream of the SCR such that the exhaust flow may be more homogenous. Other attempts to address urea mixing include a stationary mixing apparatus. One example approach is shown by Cho et al. in U.S. 2013/0104531. Therein, a static mixer is located in an exhaust passage downstream of an external tube for injecting urea. The exhaust gas flows through the exhaust passage and combines with a urea injection before flowing through the static mixer.

However, the inventors herein have recognized potential issues with such systems. As one example, the static mixer described above presents limited mixing capabilities due to a directionality of exhaust outflow through the mixer unable to fully mix a laminar exhaust flow. The static mixer inside the exhaust passage also presents manufacturing and packaging constraints. Varying exhaust passage geometries demand an alteration in the manufacturing of the static mixer for the mixer to tightly fit within the exhaust passage.

In one example, the issues described above may be addressed by a mixer comprising a hollow, annular ring having an internal exhaust passage, the ring including inlets located on a downstream inner surface and outlets located along an intersection between an upstream inner surface and the downstream inner surface adjacent to a throat of a venturi passage upstream of an SCR device, and a urea injector positioned to inject into the ring. In this way, the outlets may be fluidly coupled to a vacuum generated by flowing exhaust gas through the venturi passage.

As one example, vacuum generated by the venturi passage is supplied to an annular chamber created in the space outside the upstream and downstream inner surfaces and within the exhaust passage, where the vacuum supplied may draw exhaust gas through the inlets into the annular chamber. Exhaust gas in the annular chamber may mix with urea and/or exhaust gas from different regions of an exhaust passage. The inner ring surface may be shaped to form the venturi, and may fully separate exhaust in the central passage from the hollow interior, except for the inlets and outlet. The mixture of exhaust gas and urea flows into the inner central exhaust passage via the vacuum generated, where the mixture may merge with exhaust free of injected reductant. In this way, an entire exhaust flow through the exhaust passage may come into more contact with urea and improve an overall reduction of the SCR device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4 are shown approximately to scale, although other relative dimensions may be used.

DETAILED DESCRIPTION

Figure 1:
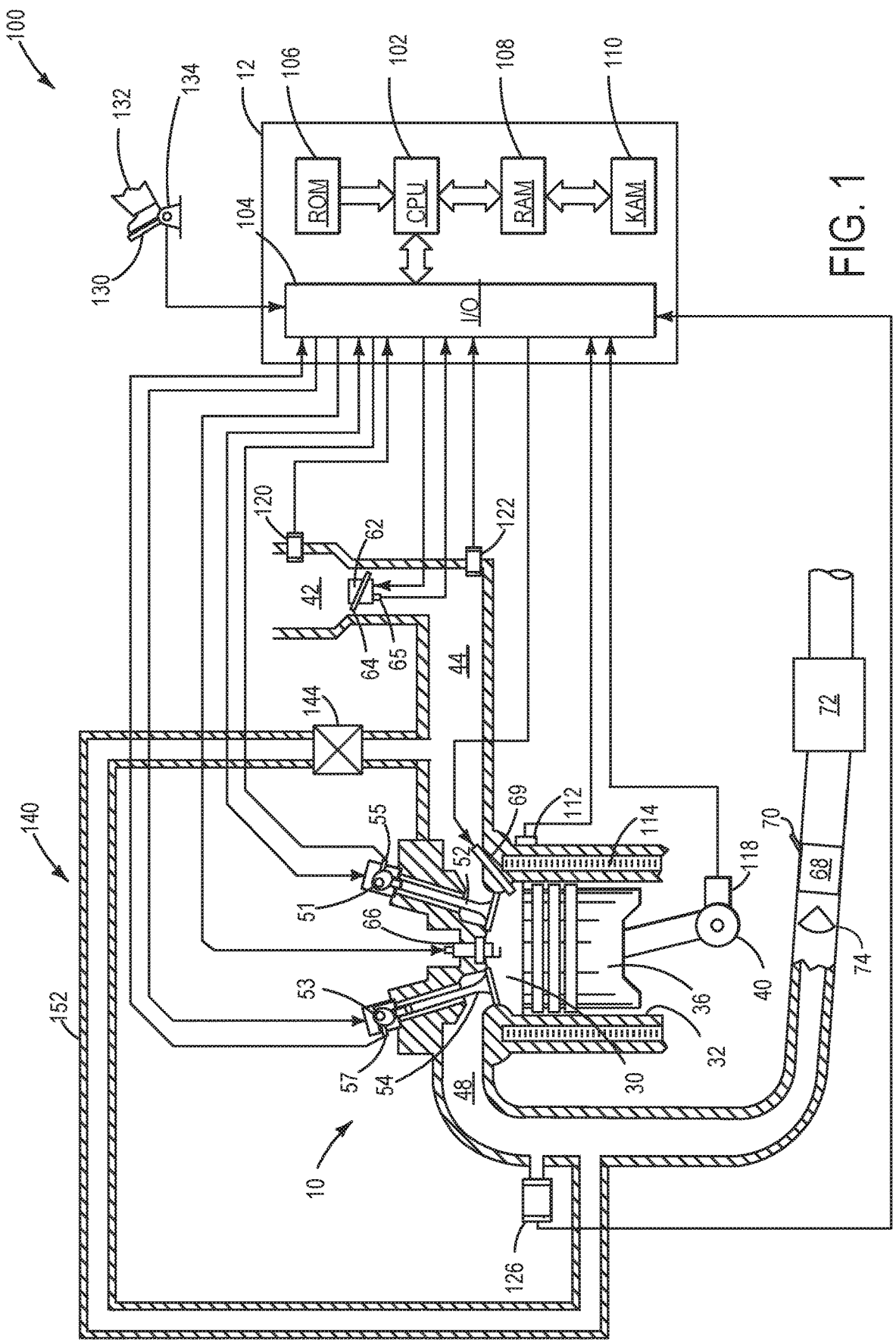
FIG. 1 shows a schematic view of an engine with a mixer.
Figure 2:
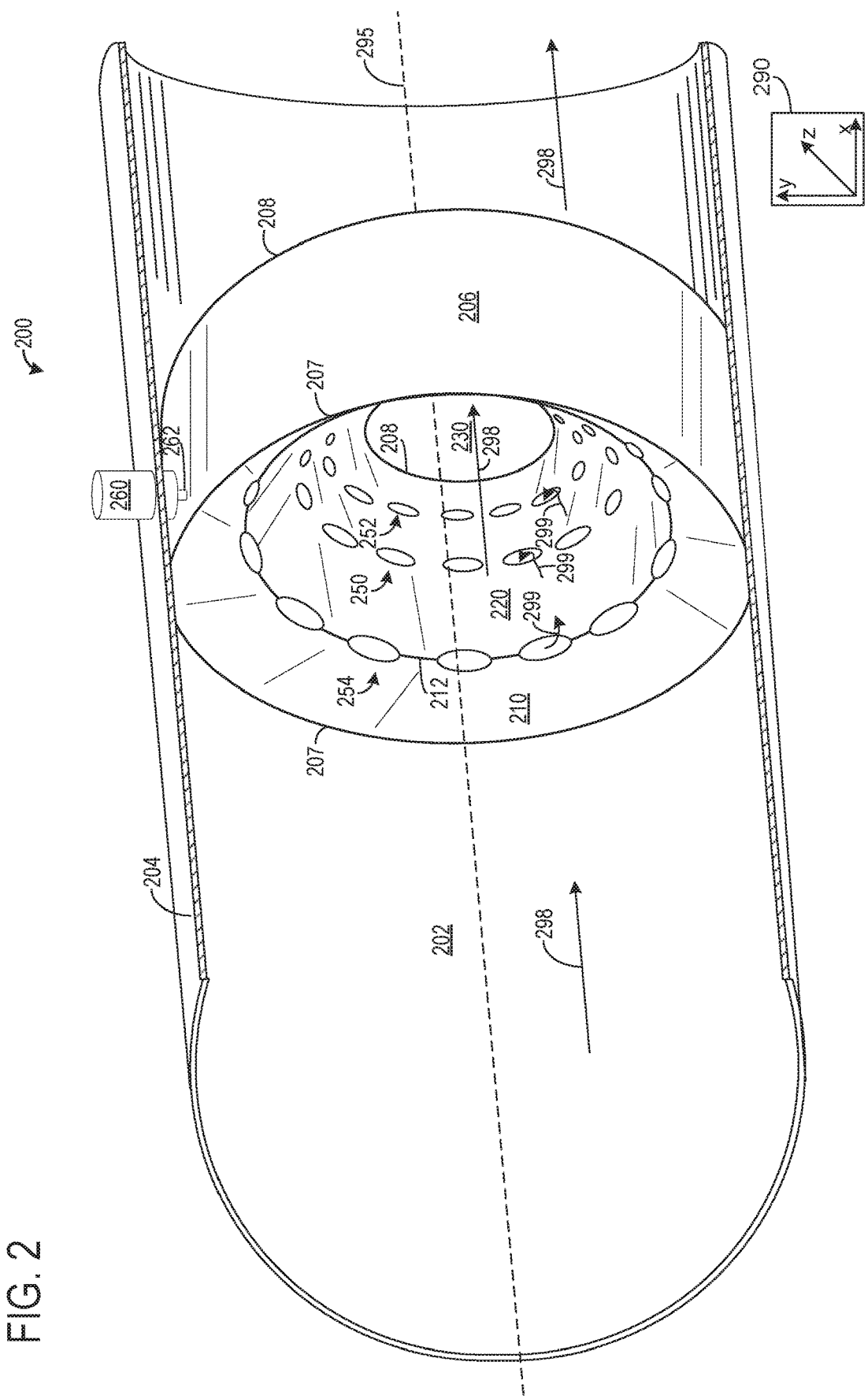
FIG. 2 shows an isometric view of the mixer located along an exhaust passage.
Figure 3:
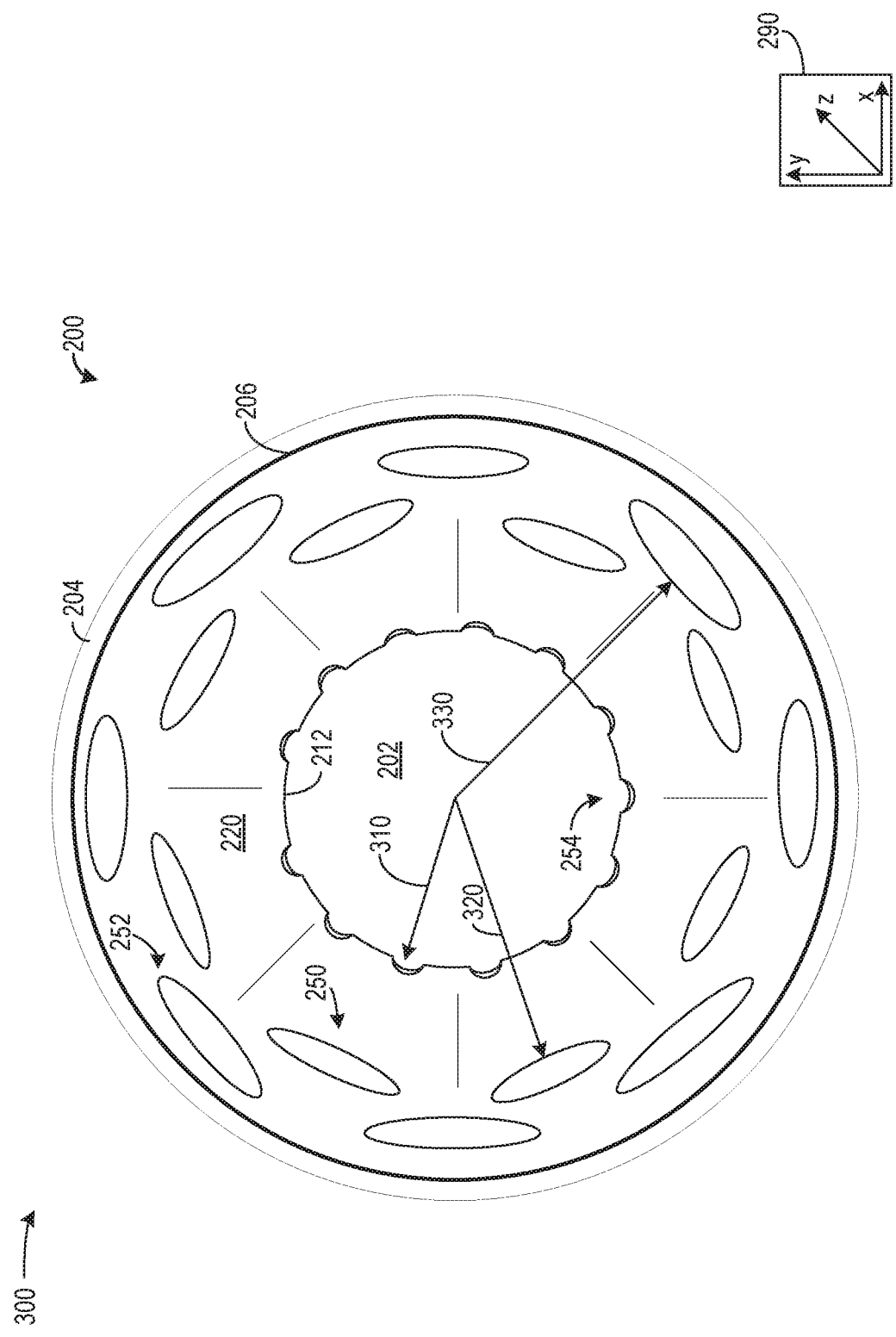
FIG. 3 shows a downstream-to-upstream face-on view of the mixer.
Figure 4:
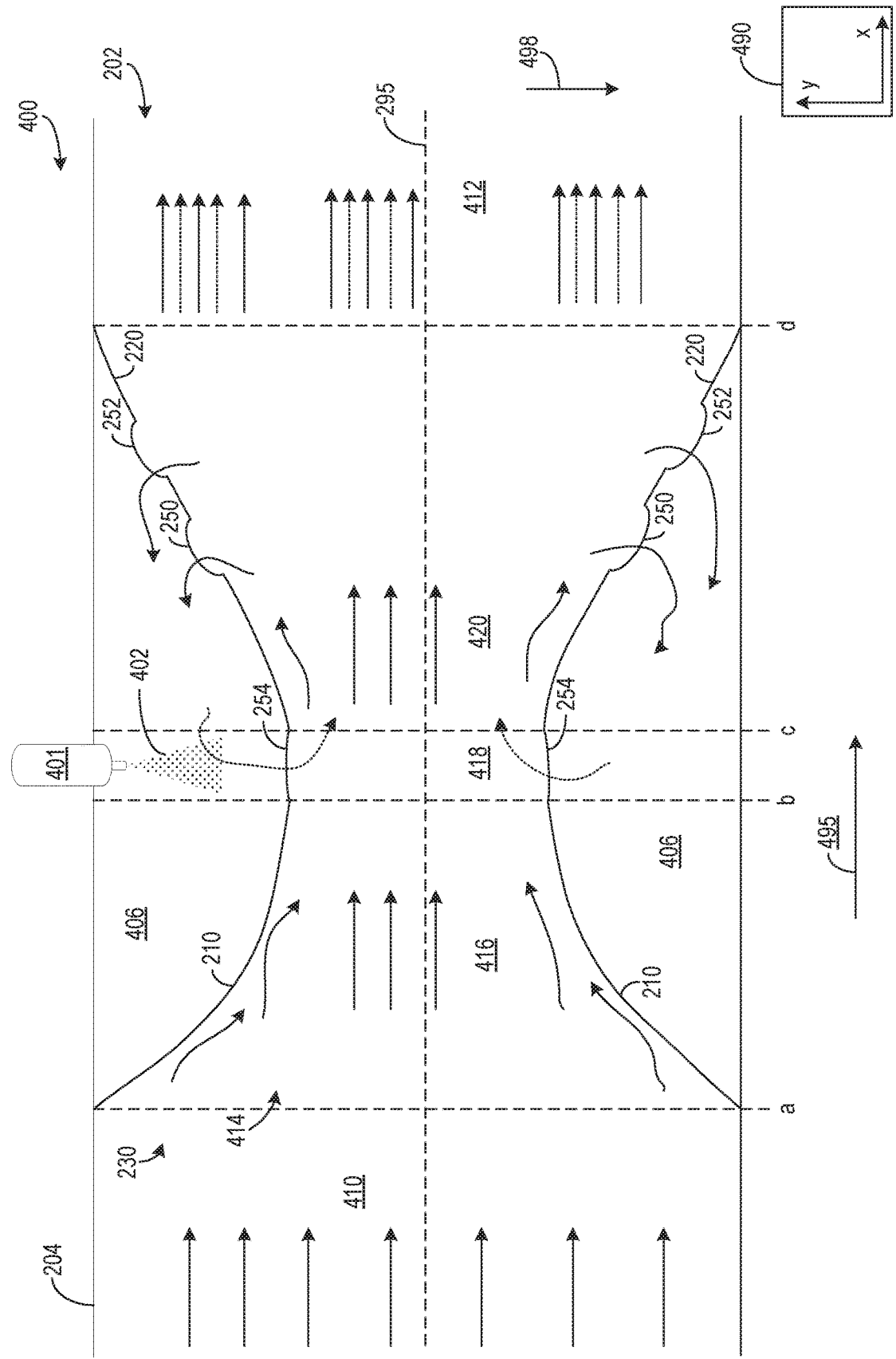
FIG. 4 shows a cross-sectional view of the mixer with an example exhaust flow being conducted through the mixer.
Figure 5:
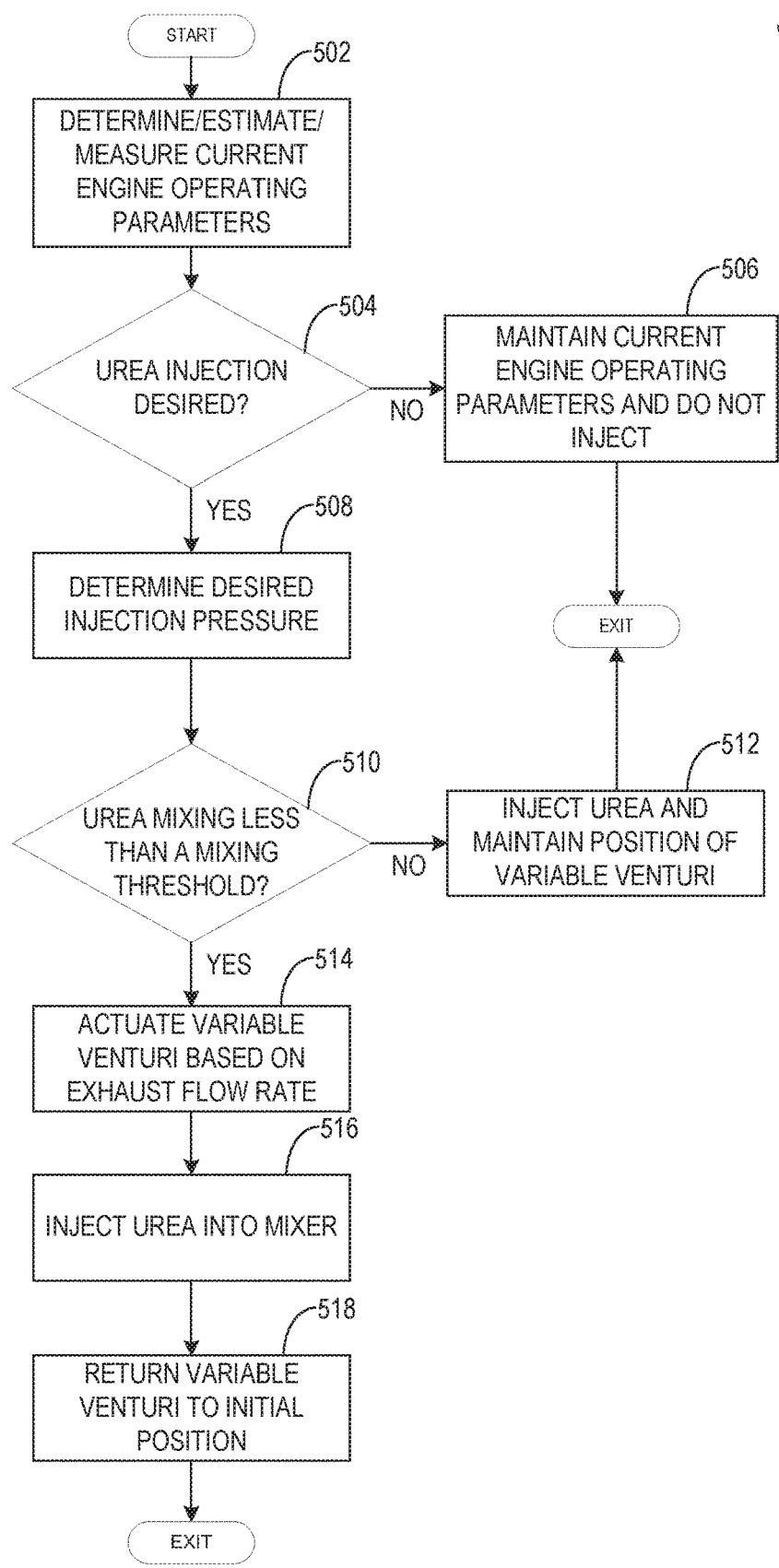
FIG. 5 shows a method for operating an injector of the mixer.

The following description relates to systems and methods for a urea mixer configured to receive a urea injection from an injector. The urea mixer may be located upstream of an SCR catalyst, as shown in FIG. 1. A venturi device may be located upstream of the urea mixer to further promote urea mixing. The urea mixer is in face-sharing contact with an exhaust pipe, where the urea mixer annularly protrudes into an exhaust passage, as shown in FIG. 2. The urea mixer comprises a curved upstream wall and a curved downstream wall, where the urea mixer annularly protrudes from the exhaust pipe into the exhaust passage. Inlets are misaligned and located on the downstream wall, as shown in FIG. 3. Outlets are located on an intersection between the upstream and downstream walls, also shown in FIG. 3. A side-on view of the mixer depicting a degree of the contour of the upstream side and a degree of the contour of the downstream side along with an example flow of exhaust gas through the mixer is shown in FIG. 4. A method for operating the urea injector and the venturi is shown in FIG. 5.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 72 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 72 is shown arranged along the exhaust passage 48 downstream of both the exhaust gas sensor 126 and a mixer 68. The device 72 may be a three way catalyst (TWC), $NO_x$ trap, selective catalytic reductant (SCR), various other emission control devices, or combinations thereof. In some examples, during operation of the engine 10, the emission control device 72 may be periodically reset by operating at least one cylinder of the engine within a particular air-fuel ratio.

The mixer 68 is shown upstream of the emission control device 72 and downstream of the exhaust gas sensor 126. In some embodiments, additionally or alternatively, a second exhaust gas sensor may be located between the mixer 68 and the emission control device 72. An injector 70 is positioned to inject fluid into the mixer 68. The injector 70 may be fluidly coupled to a reservoir comprising a fluid, where the fluid may be a reductant (e.g., urea) in one example. The mixer 68 may be an annular protrusion extending into the exhaust passage 48. The mixer is configured to receive exhaust gas and further comprises an annular interior passage for mixing the urea and exhaust gas. The mixer 68 expels exhaust gas via a vacuum effect generated by a venturi passage extending through a bore of the mixer 68. An adjustable venturi device 74 may be located upstream of the mixer 68, where the adjustable venturi may be actuated toward the mixer 68 to increase the vacuum effect generated by the venturi passage.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting an oxidation state of the SCR may include adjusting an actuator of the urea injector to inject urea to reduce the SCR. For example, adjusting an injection into the mixer may include adjusting an actuator of the injector to open an orifice of the injector to spray an amount of fluid into the mixer.

FIG. 2 shows an isometric view of a mixer 200 positioned along an exhaust passage 202 within an exhaust pipe 204. The mixer 200 may be used similarly to mixer 68 in the embodiment of FIG. 1. The mixer 200 is contiguous and hollow, with an uninterrupted passage located therein for mixing urea with exhaust gas. The mixer 200 may receive exhaust gas via a plurality of inlets and expel exhaust gas via a plurality of outlets. In the current depiction, a portion of the exhaust pipe 204 is omitted to reveal the mixer 200. The mixer 200 is fixed in the exhaust passage 202 and may not be coupled to mechanical or electronic actuators.

An axis system 290 is shown comprising three axes, an x-axis in the horizontal direction, a y-axis in the vertical direction, and a z-axis in a direction perpendicular to both the x and y axes. A central axis 295 of the exhaust pipe 204 is shown by a dashed line. The mixer 200 may be symmetric about the central axis 295. An overall direction of exhaust flow is depicted by arrows 298.

The mixer 200 may be a single machined piece. The mixer 200 may be composed of one or more of a ceramic material, a metal alloy, a silicon derivative, or other suitable materials capable of withstanding high temperatures while also mitigating friction experienced by an exhaust flow such that an exhaust pressure is maintained. Additionally or alternatively, the mixer 200 may comprise of one or more coatings and materials such that exhaust may contact surfaces of the mixer 200 without depositing soot or other exhaust gas components on the mixer 200.

The exhaust pipe 204 is tubular and configured to conduct exhaust gas through the exhaust passage 202. The mixer 200 is in face-sharing contact with an interior circumference of the exhaust pipe 204 via an outer annular surface 206 in such a way that gas may not flow between the outer annular surface and the exhaust pipe 204. The outer annular surface 206 may be coupled to the exhaust pipe 204 via welds, adhesives, and/or other suitable coupling means providing a hermetic seal. In some embodiments, the mixer 200 may be forcibly slid into the exhaust passage 202. In this way, the mixer 200 comprises an outer circumference correspondingly smaller than the interior circumference of the exhaust pipe 204 such that the mixer is located along the exhaust passage 202 while allowing substantially no exhaust gas to flow between the exhaust pipe and the outer annular surface 206.

The outer annular surface 206 comprises a width equal to a distance between an upstream edge 207 and a downstream edge 208. A circumference of the upstream edge 207 is substantially equal to a circumference of the downstream edge 208. A first inner surface 210 of the mixer 200 is located between the upstream edge 207 and an annular intersect 212. A second inner surface 220 is located between the annular intersect 212 and the downstream edge 208. The first inner surface 210 may be continuous with at least some portions of the second inner surface 220. Therefore, the first inner surface 210 is located upstream of the second inner surface 220. The first inner surface 210 may herein be referred to as the upstream surface 210 and the second inner surface 220 may herein be referred to as the downstream surface 220.

The upstream surface 210 and the downstream surface 220 extend from the outer annular surface 206 and radially protrude into the exhaust passage 202. A bore (opening) 230 is formed by the protruding surfaces of the mixer 200 such that the exhaust passage 202 narrows through the mixer forming a central exhaust passage. This narrowing of the central exhaust passage may generate an inner passage (e.g., throat) of a venturi passage within the exhaust passage, as will be described in greater detail below. The upstream 210 and downstream 220 surfaces are radially spaced away from the central axis 295.

The upstream surface 210 is curved and becomes decreasingly radially spaced away from the central axis 295 in a downstream direction. The downstream surface 220 is curved and becomes increasingly radially spaced away from the central axis 295 in the downstream direction. As an example, the upstream surface 210 may be outwardly curved and the downstream surface 220 may be inwardly curved relative to the central axis 295. In this way, the annular intersect 212, located at a merging of the upstream 210 and downstream 220 surfaces, is adjacent to a narrowest portion of the exhaust passage 202 within the bore 230.

As described above, the mixer 200 is hollow with an annular chamber located interior to the upstream surface 210, the downstream surface 220, and the outer annular surface 206. The annular chamber spans an entire 360° of an interior of the mixer 200. The annular chamber is configured to receive exhaust gas through a plurality of inlets, where the plurality of inlets comprise upstream inlets 250 and downstream inlets 252. Upstream inlets 250 are located closer to the annular intersect 212 than the downstream inlets 252. The upstream inlets 250 may be aligned with one another at a common axial position along exhaust flow through the exhaust passage, as can downstream inlets 252. Upstream 250 and downstream 252 inlets may admit exhaust gas in a plurality of directions further including a first direction oblique to arrows 298 (exhaust flow in the exhaust passage 202) and a second direction perpendicular to arrows 298. A plurality of outlets 254 are located along the annular intersect 212 upstream of the upstream 250 and downstream 252 inlets. In this way, exhaust gas in the annular chamber flows in the upstream direction (negative x-axis), opposite arrows 298, to mix with urea and flow through the outlets 254 and back into the exhaust passage 202 in a radially inward direction. The outlets 254 are located adjacent to the narrowest portion of the exhaust passage 202 extending through the bore 230. The mixer 200 comprises no other inlets and no additional outlets other than the upstream inlets 250, the downstream inlets 252, and the outlets 254. As an example, the upstream inner surface 210 and the downstream inner surface 220 are continuous and are the only walls (surfaces) separating the annular chamber from the exhaust passage 202.

A vacuum may be generated at the narrowest portion of the exhaust passage 202 in the bore 230 as exhaust flows through the exhaust passage 202. The vacuum generated may be supplied to the annular chamber of the mixer 200 via the outlets 254. The vacuum supplied may promote exhaust to enter the annular chamber via the upstream 250 or downstream 252 inlets. The vacuum may further promote increased swirling and/or turbulence of the exhaust gas in the annular chamber compared to the exhaust passage 202. This may also improve mixing within the mixer 200.

Arrows 299 show an example flow of exhaust gas through the mixer 200. As shown, a portion of exhaust flows passed the upstream surface 210, the outlets 254, and the upstream 250 and downstream 252 inlets without interact with the mixer 200. A remaining portion of exhaust gas may flow passed the outlets 254, but then flow into the upstream 250 or downstream 252 inlets in a radially outward direction before turning in the upstream direction in the annular chamber of the mixer 200. Thus, a distance exhaust flows may be increased when the exhaust enters the mixer 200 compared to exhaust flowing through only the exhaust passage 202. Exhaust gas in the annular chamber may mix with urea and/or exhaust gas from different region of the exhaust passage in the annular chamber. Exhaust gas from different regions of the mixer including regions adjacent the exhaust pipe 204 and regions adjacent the central axis 295 may flow into the annular chamber. Exhaust gas flows out of the annular interior passage via the outlets 254 proximal to the central axis 295 in a radially inward direction before turning to flow in a direction parallel to arrows 298. Mixed exhaust gas from the mixer 200 may merge with unmixed exhaust gas in the exhaust passage 202, increasing a homogeneity of exhaust gas flowing to downstream components located in the exhaust passage. By flowing in the radially inward direction, which is perpendicular to arrows 298, the mixed exhaust gas may increase a turbulence of unmixed exhaust gas in the exhaust passage 202. In this way, mixing may occur in the exhaust passage 202 due to an outflow of exhaust gas from the mixer 200. Mixed exhaust gas may be described as exhaust gas that has flowed through the mixer and unmixed exhaust gas may be described as exhaust gas that has not flowed through the mixer.

An injector 260 is positioned to inject fluid into the annular chamber of the mixer 200. In one example, the injector 260 is a urea injector and the fluid is urea. The injector 260 may extend through an upper receiving orifice of the exhaust pipe 204 and the outer annular surface 206, where a nozzle 262 is located inside the annular chamber. The injector 260 protrudes through a highest wall of the exhaust pipe 204 and the mixer 200 into the annular chamber outside of the central exhaust passage for a vehicle positioned on level ground. Exhaust gas may not flow out the exhaust pipe via the upper receiving orifice. Therefore, the injector 260 is hermetically coupled to the exhaust pipe 204 and the outer annular surface 206. The nozzle 262 may atomize a fluid injection, allowing the fluid injection to be more easily mixed within the annular chamber compared to a non-atomized fluid injection. The injector 260 may be instructed to inject fluid based on one or more conditions of an aftertreatment device located downstream of the mixer 200 via a controller (e.g., controller 12). In one example, the injector 260 injects urea in response to an oxidation of an SCR device being greater than a threshold oxidation. By doing this, urea may be injected into the annular chamber, where exhaust gas may mix with the urea. The mixture of exhaust gas and urea flows into the exhaust passage 202 and combines with unmixed exhaust gas. The increased turbulence of the mixed exhaust gas mixing with the unmixed exhaust gas may increase urea dispersion along the exhaust passage 202 such that urea may be located in a plurality of regions in the exhaust passage including adjacent to the exhaust pipe 204 and adjacent to the central axis 295.

Thus, a mixer comprising an annular protrusion extending into an exhaust passage may continuously mix gas in the exhaust passage during engine operation. The mixer alters a shape of a central exhaust passage adjacent its bore to resemble a venturi passage. The venturi generates a vacuum at an inner passage (throat) located along a narrowest portion of the central exhaust passage as exhaust flows through the bore, where an annular passage of the mixer is coupled to the vacuum generated, thereby supplying a vacuum to the mixer. The vacuum may promote gas to flow through upstream or downstream inlets of the mixer and into the annular chamber. Gas may mix within the annular chamber before flowing through the outlets and into the exhaust passage. Mixing in the annular chamber may occur in the presence of a urea injection in some instances. A mixture of gas and urea may flow into the exhaust passage where the mixture may merge with unmixed gas (e.g., exhaust gas free of urea), which may increase a dispersion of urea in the exhaust passage. Exhaust gas homogeneity may also increase.

FIG. 3 shows a downstream-to-upstream view 300 of the mixer 200. Thus, components previously presented may be similarly numbered in subsequent figures. The mixer 200 is in face-sharing contact with interior surfaces of the exhaust pipe 204. An upstream surface is occluded in the downstream-to-upstream view 300. An axis system 290 comprising three axes, an x-axis in the horizontal direction, a y-axis in the vertical direction, and a z-axis in a direction perpendicular to the x and y axes is shown.

The mixer 200 is hermetically sealed and fully enclosed from an ambient atmosphere outside the exhaust pipe 204 via a coupling between the exhaust pipe and an outer annular surface 206. The mixer 200 receives exhaust gas via one or more upstream inlets 250 and downstream inlets 252. The upstream inlets 250 are located upstream of the downstream inlets 252 with respect to a direction of exhaust gas flow (parallel to a negative z-axis). Outlets 254 are located upstream of the upstream 250 and downstream 252 inlets. The outlets 254 may expel exhaust gas from the annular chamber into the exhaust passage.

The outlets 254, upstream inlets 250, and downstream inlets 252 are radially misaligned with one another. In some examples, the inlets and the outlets may be radially aligned. An opening size of the upstream inlets 250 and the downstream inlets 252 may be substantially identical in one example. In another example, an opening size of the upstream inlets 250 may be bigger than or smaller than the downstream inlets 252. Substantially identical may be defined as a deviation between an opening size of the upstream inlets 250 and an opening size of the downstream inlets being within 1-5% due to manufacturing intolerances. In one example, the downstream inlets 252 are bigger than the upstream inlets 250, which are bigger than the outlets 254. An orientation of the upstream inlets 250 and the downstream inlets 252 may be equal or unequal in some embodiments.

A number of upstream inlets 250 may be equal to a number of downstream inlet 252. A total number of inlets (sum of the number of upstream and downstream inlets) may be greater than a number of outlets 254. In some examples, the number of outlets 254 may be equal to the total number of inlets. A total surface area of the outlets 254 may be equal to a total surface area of the upstream inlets 250 and/or a total surface area of the downstream inlets 252. In this way, a flow rate through the upstream or downstream inlets may be equal to a flow rate through the outlets. The inlets and outlets 254 may be oblong as an example. In other examples, the inlets and outlets 254 may be circular, square, diamond, triangular, hexagonal, or other suitable shapes.

A first radius 310 of the mixer 200 extends from a center of the exhaust passage 202 to one outlet of the outlets 254. A second radius 320 of the mixer 200 extends from the center of the exhaust pipe to one inlet of the upstream inlets 250. A third radius 330 of the mixer 200 extends from the center of the exhaust pipe 204 to one inlet of the downstream inlets 252. The third radius 330 is greater than the second radius 320, and the second radius 320 is greater than the first radius 310. In this way, the downstream inlets 252 may receive exhaust gas from a more outer region (closer to the exhaust pipe 204) of the exhaust passage 202 compared to the upstream inlets 250. Furthermore, the outlets 254 are located adjacent a narrowest portion of the exhaust passage 202, as indicated by the first radius 310.

The outlets 254 face a direction perpendicular to exhaust flowing through the exhaust passage 202. This may improve mixing in the exhaust passage when mixed exhaust collides with unmixed exhaust, thereby increasing turbulence in the exhaust passage 202 outside of the annular interior passage. Upstream inlets 250 and downstream inlets 252 face a downstream direction parallel to incoming exhaust gas flow. Exhaust gas may bend and/or diverts its flow direction to enter the inlets. This may improve a swirling and/or turbulence of exhaust gas in the mixer, which may result in increased mixing of urea with exhaust gas. Exhaust gas mixing may still occur in the mixer 200 in the absence of a urea injection.

FIG. 4 shows a side-on cross-section 400 depicting an exemplary flow of exhaust gas through the mixer 200 in conjunction with a urea injection 402. As described above, exhaust gas may be mixed in the mixer 200 in the absence of a urea injection. Upstream and downstream directions may be described below relative to a general direction of exhaust flow parallel with arrow 495.

An axis system 490 comprises two axes, an x-axis in the horizontal direction and a y-axis in the vertical direction. A central axis 295 of the exhaust pipe 204 is shown via a dashed line. Arrow 498 indicates a downward direction parallel to a force of gravity. The exhaust passage 202 comprises an upstream exhaust passage 410 and a downstream exhaust passage 412 with an interior passage 414 (e.g., central exhaust passage) located therebetween.

The mixer 200 comprises a curved upstream surface 210 located between lines a and b, an annular intersect 212 located between lines b and c, and a curved downstream side located between lines c and d. A radial height of the mixer increases from line a to line b. A radial height may be defined as a length of the mixer 200 extending from the exhaust pipe 204 to the central axis 295. The radial height is substantially constant between lines b and c, where deviations may occur at outlets 254. The radial height of the mixer decreases between line c to line d, where a rate at which the radial height decreases from line c to line d is less than a rate at which the radial height increase from line a to line b. In this way, the upstream surface 210 has a greater slope than the downstream surface 220.

A bore 230 of the mixer 200 extends between lines a to d, where a venturi passage is formed interior to the bore 230, as described above. Therefore, interior passage 414 may herein be referred to as venturi passage 414. The venturi passage 414 comprises a venturi inlet 416 located between line a and line b. Therefore, the region between lines a and b may be referred to herein as the venturi inlet 416. The venturi passage 414 further comprises a venturi outlet 420 located between lines c and d. Therefore, the region between lines c and d may herein be referred to as the venturi outlet 420. The venturi passage further comprises a throat 418 located between lines b and c, fluidly coupling the venturi inlet 416 and the venturi outlet 420. The region between lines b and c may be referred to herein as the throat 418.

The radial height of the mixer 200 is inversely proportional to a diameter of the venturi passage 414. Therefore, the diameter of the venturi inlet 416 decreases in a downstream direction and the diameter of the venturi outlet 420 increases in the downstream direction in a manner corresponding to the curvature of the upstream surface 210 and the downstream surface 220, respectively. The diameter of the throat 418 is the smallest diameter of the venturi passage 414. Thus, the throat 418 is sized to decrease a pressure of exhaust gas while increasing a velocity of exhaust gas flowing through the venturi passage 414, thereby providing a vacuum to an annular chamber 406 via the outlets 254.

Exhaust gas flowing through the exhaust passage 202 flows from the upstream exhaust passage 410 and into the venturi passage 414 in the bore 230. Exhaust gas flows into the venturi inlet 416, where exhaust gas may contact the upstream surface 210. In one example, exhaust gas proximal to the exhaust pipe 204 contacts the upstream surface 210, where the exhaust may ricochet in a number of directions oblique to its original flow path. Exhaust gas proximal to the central axis 295 may not contact the upstream surface 210, where its flow path may be uninterrupted or may be altered due to collisions occurring between it and exhaust gas colliding with the upstream surface 210.

Exhaust gas flows proximal to the central axis 295 from the venturi inlet 416 to the throat 418. A pressure of exhaust gas in the throat 418 is less than a pressure of exhaust gas in the venturi inlet 416. This generates a vacuum adjacent the outlets 254, which may be supplied to the annular chamber 406. A strength of the vacuum generated may be based on an exhaust gas flow rate and/or an engine load. In some embodiments, the strength of the vacuum may be increased by actuating a variable venturi device toward the mixer 200, as will be described below. Exhaust gas in the throat 418 may flow by the outlets 254 due to its increased velocity compared to the venturi inlet 416.

Exhaust gas may flow away from the central axis 295 as it flows from the throat 418 to the venturi outlet 420. A portion of exhaust gas may flow through the venturi outlet 420 and into the downstream exhaust passage 412 uninterruptedly while a remaining portion of exhaust gas in the venturi outlet 420 may flow through the upstream 250 and downstream 252 inlets. Exhaust gas flow into the inlets may be promoted by the vacuum supplied to the mixer 200. Exhaust gas flowing through the inlets may flow in a plurality of angles including a first angle perpendicular to the arrow 495 and a second angle oblique to the arrow 495. These changes in exhaust flow direction may increase a mixing ability in the annular chamber 406.

Exhaust gas in the annular chamber 406 may flow through portions of the mixer 200 above and below the central axis 295. As shown in FIG. 2, the mixer 200 is contiguous about an entire circumference of the exhaust pipe 204. This allows the exhaust gas in the annular chamber 406 to flow uninterruptedly through the chamber. Exhaust gas flow from the inlets to the outlets 254 in a direction substantially opposite to arrow 495. Exhaust gas in the chamber 406 may mix with the urea injection 402 before flowing through the outlets 254 at a plurality of angles into the throat 418. In one example, the exhaust gas may flow through the outlets 254 at a first angle perpendicular to the arrow 495. Exhaust gas that has flowed through the mixer 200 (e.g., mixed gas) is shown by dashed arrows. The urea injector 401 may inject urea into the annular chamber 406 directly above the outlets 254, and therefore the throat 418, parallel to a direction of gravity. Thus, the vacuum supplied by the throat may assist in drawing the urea into the venturi passage 414 and limit a volume of urea impinging on interior surfaces of the annular chamber 406. In some embodiments, the urea injector 401 may inject urea in a direction oblique to the direction of gravity and/or offset to the outlets 254.

Exhaust gas flowing through the outlets 254 may merge with exhaust gas proximal to the central axis 295 in the throat 418. The unmixed exhaust gas (indicated by solid line arrows) and the mixed exhaust gas (indicated by dashed line arrows) flow together in the venturi outlet 420 before entering the downstream exhaust passage 412. Mixed exhaust gas and unmixed exhaust gas are located together proximal to the exhaust pipe 204 and proximal to the central axis 295, resulting in a dispersion of urea throughout the downstream exhaust passage 412. In this way, a catalyst located downstream of the mixer 200 may receive more homogenous exhaust gas mixture, which is better able to deliver urea to a plurality of surfaces of the catalyst, thereby improving a reduction of the catalyst.

FIG. 5 shows a method 500 for operating a urea injector of a mixer. The method 500 may further be used to adjust a position of a variable venturi device located upstream of the mixer. Instructions for carrying out method may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. Method 500 may be described with reference to components previously introduced above.

At 502, the method 500 includes determining, estimating, and/or measuring current engine operating parameters. The current engine operating parameters may include but are not limited to one or more of vehicle speed, engine load, engine speed, manifold vacuum, exhaust temperature, vehicle miles driven, exhaust mass flow rate, and air/fuel ratio.

At 504, the method 500 includes determining if a urea injection is desired based on an oxidation state of an SCR catalyst being greater than a threshold oxidation state. The oxidation state of the SCR may be determined via one or more of a duration of time passing since a previous urea injection, a number of miles driven since a previous urea injection, and a total mass flow of exhaust flowed passed the SCR catalyst since a previous injection. The threshold oxidation state may be based on one or more of an oxidation state of catalysts in the SCR and a volume of urea in the SCR. The duration of time may be measured from a previous urea injection, where it may be desired to inject urea based on a number of hours, days, weeks, months, etc. A urea injection may occur based on a number of miles driven, where a threshold number of miles may be driven between urea injections. The threshold number of miles may be equal to 500 miles in one example. It will be appreciated by someone skilled in the art that the threshold number of miles may be other suitable distances driven such as 100 miles. Finally, a urea injection may be desired based on the total mass flow of exhaust flowing through the SCR since a previous urea injection. If the total mass flow is greater than a threshold mass flow, then the oxidation state of the SCR may be greater than the threshold oxidation state. The total mass flow may be estimated via a flow rate sensor located upstream or downstream of the SCR.

If a urea injection is not desired, then the method 500 proceeds to 508 to maintain current engine operating parameters and not inject urea. The oxidation state of the SCR is less than the threshold oxidation state and the SCR may reduce emission compounds. If a urea injection is desired, then the method 500 proceeds to 508 to determine a desired injection pressure. The desired injection pressure may be based on one or more of an engine load, a likelihood of forming urea deposits within the mixer, a current mass of deposits in the mixer, an exhaust temperature, and an exhaust flow rate. The injection pressure may increase as the engine load increases, exhaust temperature increases, and/or as the exhaust flow rate increases. The injection pressure may decrease as the likelihood of forming urea deposits within the mixer increases and/or as if the current mass of urea deposits in the mixer is greater than a threshold mass. The likelihood of forming urea deposits may be based on engine load, exhaust flow rate, mixing efficiency, urea temperature, exhaust temperature, and/or other suitable parameters affecting urea mixing and/or vacuum generation. The threshold mass may be based on a mass of deposits inhibiting urea mixing with exhaust gas in the annular chamber. The deposits may accumulate on interior surfaces of the annular chamber.

At 510, the method 500 includes determining if a urea mixing efficacy is less than a mixing threshold. The mixing threshold may be based on an amount of mixing capable of dispersing urea to region of an exhaust passage proximal to an exhaust pipe and proximal to a central axis of the exhaust pipe. The urea mixing efficacy may be estimated based on a vacuum generated in the venturi passage. The vacuum generated may be based on one or more of an engine load, exhaust flow rate, and the current mass of deposits in the mixer. In one example, the vacuum generated may increase in response to an increased engine load and/or an increased exhaust flow rate. The vacuum generated may decrease in response to the current mass of deposits in the mixer being greater than the threshold mass.

If the urea mixing efficacy is not less than the mixing threshold, then the method 500 proceeds to 512 to inject urea in the annular chamber of the mixer and does not adjust a position of the variable venturi device. In one example, the variable venturi device may be downstream of the line a in the embodiment of FIG. 4 such that the variable venturi device does not inhibit a flow of exhaust gas through the venturi passage.

If the urea mixing efficacy is less than the mixing threshold, then the method 500 proceeds to 514 to actuate the variable venturi device in a downstream direction. Referring to FIG. 4, a starting position of the variable venturi device may be upstream of line a (a venturi inlet) and the device may be actuated downstream to a position adjacent line b (a throat). In some examples, the variable venturi may be actuated to a position between line a and line b based on an engine load. As an example, if an engine load is low and an exhaust flow rate is low, then the variable venturi may be actuated to a downstream position proximal to line b, such that a greater amount of vacuum is generated between lines b and c when exhaust flows through the venturi passage in the embodiment of FIG. 4. As another example, if an EGR flow rate is high, the variable venturi device may be actuated to a downstream position proximal to line b in the embodiment of FIG. 4. As a further example, if engine load is a mid-load, then the variable venturi device may be actuated to a position between line a and line b of FIG. 4. In this way, the variable venturi device may increase vacuum generation during vehicle conditions that may not promote sufficient vacuum generation to enable a urea mixing efficacy greater than the mixing threshold.

At 516, the method 500 injects urea into the annular chamber of the mixer at the desired injection pressure with the variable venturi device actuated to a position downstream of its initial location.

At 518, the method 500 includes moving the variable venturi back to its starting position once the urea injection is disabled. By doing this, the variable venturi may be a downstream position outside of the starting position only when a urea injection is desired. This may allow exhaust gas to flow uninterruptedly through the venturi passage when a urea injection is not desired.

In this way, a compact, easy to design urea mixer may be located along an exhaust passage upstream of an SCR device. The urea mixer may increase urea mixing by combining exhaust and urea in the mixer and releasing the mixture to the exhaust passage in a direction substantially perpendicular to exhaust flow. The technical effect of configuring a urea mixer to receive a urea injection and exhaust flow is to improve SCR reactivity via increased urea dispersion. A venturi passage is located inside of a bore of the mixer, where the venturi passage may promote mixing within the mixer.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
injecting a reductant vertically above outlets on a surface of a hollow, annular mixer into an annular chamber within the hollow annular mixer that is positioned within an exhaust passage,
the hollow, annular mixer configured with downstream inlets on the surface of the hollow, annular mixer for receiving exhaust flow and mixing the exhaust flow from the inlets with the reductant in the annular chamber, the mixed exhaust and reductant flowing out of outlets on the surface of the mixer and where the inlets are located downstream of the outlets along a venturi passage located along a bore of the hollow, annular mixer.

2. The method of claim 1, wherein the injecting the reductant is in response to an oxidation state of a catalyst being less than a threshold oxidation, and wherein the oxidation state of the catalyst is based on a duration since a previous injection.

3. The method of claim 1, wherein the injecting further comprises an injecting pressure, and wherein the injecting pressure is based on a mass of accumulated reductant on interior surfaces of the hollow, annular mixer.

4. The method of claim 1, further comprising flowing exhaust through the downstream inlets at a plurality of angles including a first angle perpendicular to a direction of the exhaust flow in an exhaust passage and a second angle oblique to the direction of the exhaust flow in the exhaust passage.

5. A method comprising:
injecting a reductant into an annular chamber within a hollow, annular mixer that is positioned within an exhaust passage;

drawing exhaust flow through inlets in a surface of the hollow annular mixer into the annular chamber; mixing the exhaust flow from the inlets and the injected reductant within the annular chamber; and flowing the mixed exhaust and reductant out of outlets in the surface of the hollow, annular mixer, and the outlets that are located adjacent a throat of a venturi passage positioned upstream of the inlets along the venturi passage of the hollow annular mixer relative to flow through the exhaust passage.

6. The method of claim 5, wherein the hollow, annular mixer comprises an outer annular surface in face sharing contact with the exhaust passage.

7. The method of claim 5, further comprising actuating a variable venturi device from a first position at a venturi throat inlet of the hollow, annular mixer to a second position at the throat of the venturi passage of the hollow, annular mixer in response to a determined urea mixing efficiency being below a mixing threshold.

8. The method of claim 7, further comprising maintaining the variable venturi device in the first position in response to the determined urea mixing efficiency being above the mixing threshold.

9. The method of claim 7, further comprising returning the variable venturi device to the first position after injection of the reductant.

10. The method of claim 5, wherein the hollow, annular mixer comprises: a ring of the outlets, a first ring of the inlets downstream from the outlets, and a second ring of the inlets downstream from the ring of outlets and the first ring of the inlets.

11. The method of claim 5, wherein the annual chamber within the hollow, annular mixer is positioned between the surface comprising the inlets and outlets and an interior surface of the exhaust passage.

* * * * *